(12) United States Patent
Dillenberger et al.

(10) Patent No.: US 7,839,401 B2
(45) Date of Patent: Nov. 23, 2010

(54) MANAGEMENT OF ENTERPRISE SYSTEMS AND APPLICATIONS USING THREE-DIMENSIONAL VISUALIZATION TECHNOLOGY

(75) Inventors: Donna N. Dillenberger, Yorktown Heights, NY (US); Michael J Osias, Westtown, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/747,182

(22) Filed: May 10, 2007

(65) Prior Publication Data

US 2008/0281912 A1    Nov. 13, 2008

(51) Int. Cl.
*G06T 15/00* (2006.01)
*G06F 15/173* (2006.01)

(52) U.S. Cl. .................. 345/419; 345/418; 709/224

(58) Field of Classification Search .................. None
See application file for complete search history.

(56) References Cited

U.S. PATENT DOCUMENTS

| | | | |
|---|---|---|---|
| 5,353,399 | A | 10/1994 | Kuwamoto et al. |
| 5,781,229 | A | 7/1998 | Zediker et al. |
| 5,884,029 | A | 3/1999 | Brush, II et al. |
| 5,958,012 | A | 9/1999 | Battat et al. |
| 5,999,208 | A | 12/1999 | McNerney et al. |
| 6,054,987 | A | 4/2000 | Richardson |
| 6,112,015 | A * | 8/2000 | Planas et al. ............ 709/223 |
| 6,195,184 | B1 | 2/2001 | Chao et al. |
| 6,271,845 | B1 | 8/2001 | Richardson |
| 6,289,380 | B1 | 9/2001 | Battat et al. |
| 6,404,437 | B1 | 6/2002 | Russell, II et al. |
| 6,456,306 | B1 * | 9/2002 | Chin et al. .............. 715/810 |
| 6,633,312 | B1 | 10/2003 | Rochford et al. |
| 6,809,738 | B2 | 10/2004 | Hubrecht et al. |

(Continued)

FOREIGN PATENT DOCUMENTS

WO    0150387 A1    7/2001

OTHER PUBLICATIONS

Raskar et al., "The Office of the Future: A Unified Approach to Image-Based Modeling and Spatially Immersive Displays," Jul. 1998, pp. 1-10, Computer Graphics Proceedings, Annual Conference Series, Siggraph 98, Orlando.

(Continued)

*Primary Examiner*—Daniel F Hajnik
(74) *Attorney, Agent, or Firm*—William Schiesser; Hoffman Warnick LLC (57) ABSTRACT

An approach that manages enterprise systems and applications using three-dimensional visualization technology is described. In one embodiment, a system for streaming visual representations of an enterprise in near-real time. A multitude of geographically distributed enterprise datacenters are each configured to obtain event data from hardware and software elements in the enterprise. A virtual command center is configured to receive the event data, aggregate the event data into a composite dataset representative of the current operation of the enterprise, compare the composite dataset to at least one three-dimensional model representative of the operation of the geographically distributed enterprise, and provide a visualization of the composite data and any difference that may exist. The visualization is a composite of a three-dimensional visual image of the current operation of the geographically distributed enterprise.

11 Claims, 5 Drawing Sheets

U.S. PATENT DOCUMENTS

| | | |
|---|---|---|
| 6,970,919 B1 | 11/2005 | Doi et al. |
| 7,012,602 B2 | 3/2006 | Watson et al. |
| 7,055,107 B1 | 5/2006 | Rappaport et al. |
| 7,073,129 B1 | 7/2006 | Robarts et al. |
| 7,197,193 B2 | 3/2007 | Li et al. |
| 7,319,992 B2 | 1/2008 | Gaos |
| 7,487,228 B1 | 2/2009 | Preslan et al. |
| 7,502,854 B2 | 3/2009 | Luo et al. |
| 7,657,545 B2 | 2/2010 | Bird |
| 7,681,131 B1 | 3/2010 | Quarterman et al. |
| 2001/0019328 A1 | 9/2001 | Schwuttke et al. |
| 2002/0013837 A1* | 1/2002 | Battat et al. ............ 709/223 |
| 2002/0134985 A1 | 9/2002 | Chen et al. |
| 2002/0135610 A1 | 9/2002 | Ootani et al. |
| 2003/0033402 A1 | 2/2003 | Battat et al. |
| 2003/0212775 A1* | 11/2003 | Steele et al. ............ 709/223 |
| 2004/0120021 A1 | 6/2004 | Kihara et al. |
| 2005/0039132 A1 | 2/2005 | Germain et al. |
| 2005/0052714 A1 | 3/2005 | Klug et al. |
| 2005/0162721 A1 | 7/2005 | Kihara et al. |
| 2005/0183041 A1 | 8/2005 | Chiu et al. |
| 2006/0090136 A1 | 4/2006 | Miller et al. |
| 2006/0171538 A1 | 8/2006 | Larson et al. |
| 2006/0248159 A1 | 11/2006 | Polan |
| 2006/0271563 A1* | 11/2006 | Angelo et al. ............ 707/100 |
| 2006/0277080 A1 | 12/2006 | DeMartine et al. |
| 2007/0027973 A1 | 2/2007 | Stein et al. |
| 2007/0067435 A1 | 3/2007 | Landis et al. |
| 2007/0136788 A1* | 6/2007 | Monahan et al. ............ 726/3 |
| 2007/0174777 A1 | 7/2007 | Finley et al. |
| 2007/0198695 A1 | 8/2007 | Engelmann et al. |
| 2007/0213956 A1* | 9/2007 | Nasle et al. ............ 702/182 |
| 2007/0233839 A1 | 10/2007 | Gaos |
| 2008/0049013 A1 | 2/2008 | Nasle |
| 2008/0281912 A1 | 11/2008 | Dillenberger et al. |
| 2008/0282242 A1 | 11/2008 | Dillenberger et al. |
| 2010/0083148 A1 | 4/2010 | Finn et al. |

OTHER PUBLICATIONS

Guleyupoglu et al., "Distributed Collaborative Virtual Reality Framework for System Prototyping and Training," Oct. 2000, pp. 29-1 - 29-8, RTO IST Symposium, Published in RTO MP-049.

Dillenberger et al., U.S. Appl. No. 11/747,147 filed May 10, 2007, Office Communication dated Nov. 19, 2009, 20 pages.

Dillenberger et al., U.S. Appl. No. 11/747,147 filed May 10, 2007, Office Communication dated Apr. 07, 2010, 22 pages.

Dillenberger et al., U.S. Appl. No. 11/747,157 filed May 10, 2007, Office Communication dated Nov. 19, 2009, 18 pages.

Dillenberger et al., U.S. Appl. No. 11/747,157 filed May 10, 2007, Office Communication dated Mar. 25, 2010, 17 pages.

Dillenberger et al., U.S. Appl. No. 11/750,216 filed May 17, 2007, Office Communication dated Apr. 05, 2010, 10 pages Hajnik, U.S. Appl. No. 11/747,147, Office Action Communication, Sep. 21, 2010, 25 pages.

Hajnik, U.S. Appl. No. 11/750,141, Office Action Communication, Sep. 7, 2010, 25 pages.

* cited by examiner

MANAGEMENT OF ENTERPRISE SYSTEMS AND APPLICATIONS USING THREE-DIMENSIONAL VISUALIZATION TECHNOLOGY

BACKGROUND

This disclosure relates generally to enterprise systems and applications and more specifically to using three-dimensional (3D) visualization technology to provide an enterprise manager with streaming visual representations of aspects of an enterprise in near real-time.

Currently, an enterprise manager uses a large collection of disparate two-dimensional (2D) software tools such as web pages and client-server applications depending on the middleware that has been deployed. These 2D software tools generally limit the amount of information available to enterprise managers and other personnel that will use the tools. In addition, the disparate use of 2D software tools requires the users to learn many tools in order to manage the enterprise. As a result, it is very difficult for enterprise managers and other personnel that use these 2D software tools to quickly assimilate data and interact with the enterprise. Better software tools that can quickly assimilate data and enable users of the tool to effectively interact with the enterprise are therefore desirable.

SUMMARY

In one embodiment, there is a method for streaming visual representations from a plurality of geographically distributed enterprise datacenters in near-real time. In this embodiment, the method comprises: receiving event data from the plurality of geographically distributed enterprise datacenters, wherein the event data is representative of hardware and software elements that each datacenter is managing; transforming the event data from each of the plurality of geographically distributed enterprise datacenters into a visual representation of the hardware and software elements that each datacenter is managing; and placing each visual representation into a three-dimensional space that provides a single operational visualization of the geographically distributed enterprise.

In a second embodiment, there is a method for streaming visual representations from a plurality of geographically distributed enterprise datacenters in near-real time. In this embodiment, the method comprises: receiving event data from the plurality of geographically distributed enterprise datacenters; aggregating the event data into a composite dataset representative of the current operation of the geographically distributed enterprise; comparing the composite dataset to at least one three-dimensional model representative of the operation of the geographically distributed enterprise; ascertaining differences between the composite dataset and the at least one three-dimensional model, wherein the differences are indicative of potentially troubling operation; and providing a visualization of both the composite data and any difference that may exist, wherein the visualization comprises a three-dimensional composite visual image of the current operation of the geographically distributed enterprise.

In a third embodiment, there is a system for streaming visual representations of an enterprise in near-real time. In this embodiment, the system comprises a plurality of geographically distributed enterprise datacenters each configured to obtain event data from hardware and software elements in the enterprise. A virtual command center is configured to receive the event data, aggregate the event data into a composite dataset representative of the current operation of the enterprise, compare the composite dataset to at least one three-dimensional model representative of the operation of the geographically distributed enterprise, and provide a visualization of the composite data and any difference that may exist. The visualization comprises a composite a three-dimensional visual image of the current operation of the geographically distributed enterprise.

In a fourth embodiment, there is a computer-readable medium storing computer instructions, which when executed, enables a computer system to stream visual representations from a plurality of geographically distributed enterprise datacenters in near-real time. In this embodiment, the computer instructions comprises receiving event data from the plurality of geographically distributed enterprise datacenters; aggregating the event data into a composite dataset representative of the current operation of the geographically distributed enterprise; comparing the composite dataset to at least one three-dimensional model representative of the operation of the geographically distributed enterprise; ascertaining differences between the composite dataset and the at least one three-dimensional model, wherein the differences are indicative of potentially troubling operation; and providing a visualization of both the composite data and any difference that may exist, wherein the visualization comprises a three-dimensional composite visual image of the current operation of the geographically distributed enterprise.

In a fifth embodiment, there is an enterprise visualization tool for use in a computer system that streams visual representations of an enterprise in near-real time. In this embodiment, a computer infrastructure is provided and is operable to receive event data from the plurality of geographically distributed enterprise datacenters; aggregate the event data into a composite dataset representative of the current operation of the geographically distributed enterprise; compare the composite dataset to at least one three-dimensional model representative of the operation of the geographically distributed enterprise; ascertain differences between the composite dataset and the at least one three-dimensional model, wherein the differences are indicative of potentially troubling operation; and provide a visualization of both the composite data and any difference that may exist, wherein the visualization comprises a three-dimensional composite visual image of the current operation of the geographically distributed enterprise.

DETAILED DESCRIPTION

Embodiments of this disclosure are directed to a technique for streaming three-dimensional (3D) visual representations in near real-time of hardware and software elements in an enterprise. The visual representations of the hardware elements includes items such as servers, racks, networking equipment, and power and cooling, whereas software elements are visualized in terms of the structure of the underlying software or in logical terms of their business function. These elements are structurally organized into a 3D space known as a virtual command center. This virtual command center provides platform(s) for equipment, observation decks and catwalks, display screens, and various infrastructures such as the in-world communications gear.

Figure 1:
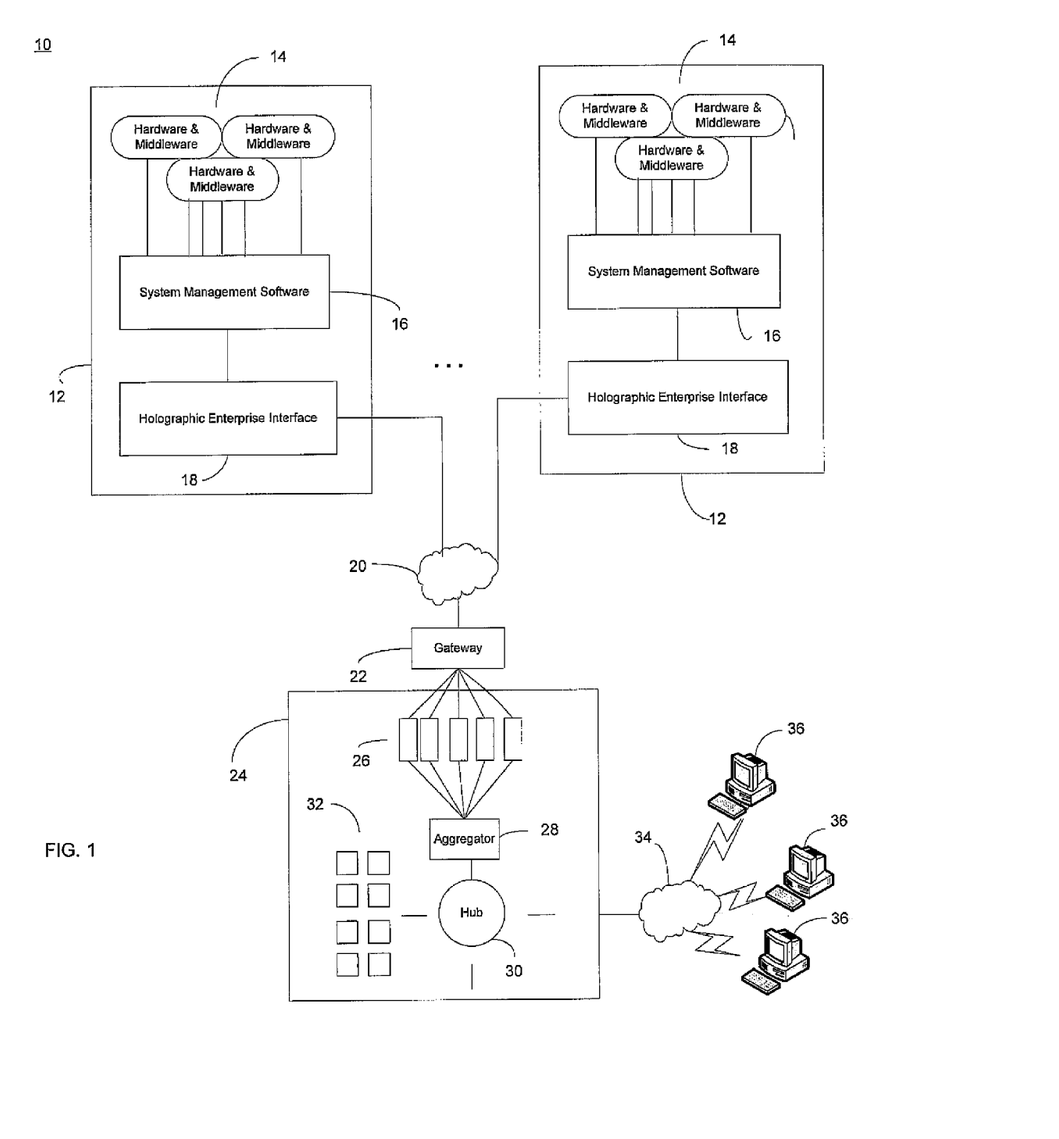
FIG. 1 shows a high-level schematic diagram showing an architectural overview of a system for streaming visual representations of an enterprise in near-real time according to one embodiment of this disclosure.

FIG. 1 shows a high-level schematic diagram showing an architectural overview of a system 10 for streaming visual representations of an enterprise in near-real time according to one embodiment of this disclosure. As shown in FIG. 1, the system comprises a plurality of geographically distributed enterprises datacenters 12. Each datacenter is responsible for managing hardware and software elements within a portion of the enterprise. The hardware and software elements are represented in FIG. 1 as hardware and middleware 14. Within each of the datacenters is system management software 16 that manages the hardware and software elements. In one embodiment, the system management software 16 includes a plurality of commercially available back-end enterprise systems that are used to manage hardware and software elements within an enterprise.

A holographic enterprise interface 18 is deployed at datacenter 12. In one embodiment, the holographic enterprise interface 18 is a plugin based component, where the plugins connect to the system management software or more specifically, to each of the back-end enterprise systems. In operation, the holographic enterprise interface transforms information from the application programming interfaces of the back-end enterprise systems into event data which is subsequently dispatched to the manager of the holographic enterprise interface 18. In one embodiment, the plugins are subclassed from a plugin base class which contains interfaces for managing the plugin instances.

The plugin manager within the holographic enterprise interface 18 routes the plugin generated events to the underlying communications systems within the holographic enterprise interface. The plugin manager also parses an XML configuration file that is the plugin descriptor defining what plugins to load. The communications system within the holographic enterprise interface 18 contains components for encoding event data from the plugins into a Holographic Protocol Architecture. The Holographic Protocol Architecture (HPA) is a protocol specification that defines packet types and conversation patterns necessary to interact with a virtual command center 24 via a communications network 20 and gateway 22. The HPA comprises a packet header detailing the packet type (4 bytes), sequence number (2 bytes), total packets (2 bytes), and a location id (2 bytes).

After the packet header is a tuple based data payload of varying length, based on constraints that may be introduced by the underlying transport. The communications system within the holographic enterprise interface 18 includes a protocol handler that encodes the data from an event system into the HPA. It also decodes the protocol and dispatches events to plugins when receiving communications from the virtual command center 24. In addition, there is a packet driver that uses a pluggable cipher component to encrypt the packet. It then interfaces with a pluggable transport provider, such as XML-RPC, to dispatch the communications to the virtual command center 24.

The following configuration enables the virtual command center 24 to operate in synchronous or asynchronous mode with the holographic interface element 18 depending on the underlying transport. In synchronous mode, queuing mechanisms are used to batch transmissions inbound to the holographic interface element 18 from the virtual command center 24. In the event of a stateless synchronous transport, the queued data is encoded into the response to the XML-RPC call, and processed by the communications system within the holographic interface element 18.

Figure 2:
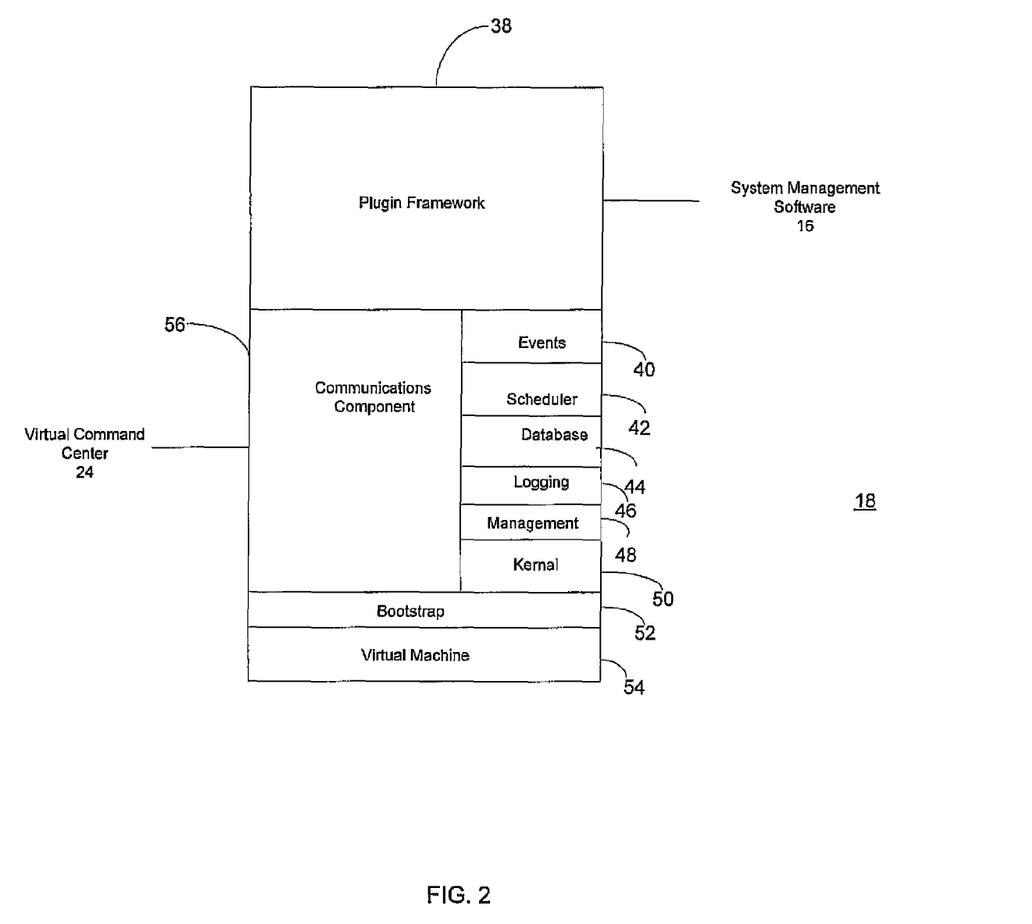
FIG. 2 shows a more detailed view of a holographic enterprise interface shown in FIG. 1.

FIG. 2 shows a more detailed view of a holographic enterprise interface 18 shown in FIG. 1. In particular, FIG. 2 shows the software components within the holographic enterprise interface 18 that perform the above-noted functions. A more detailed description is provided in commonly assigned U.S. patent application Ser. No. 11/747,147, entitled HOLOGRAPHIC ENTERPRISE NETWORK, which is filed concurrently with this patent application.

Referring back to FIG. 1, the virtual command center 24 which in one embodiment is a 3D simulator grid that structurally organizes elements of the enterprise into a 3D space. Although FIG. 1 shows the 3D simulator grid 24 separate from the datacenters 12, the simulator grid may exist at one of the datacenters or at another third party location such as a hosting provider.

The 3D simulator has the characteristics of managing a 3D vector space in which objects are placed. These objects are based on elementary geometric shapes and conic sections. They can be manipulated by applying transforms. They can be linked together to form composite objects. Objects can have scripts that are attached to them and govern their behavior. Objects can listen on 65535 channels for messages coming from the simulator environment. Objects can manage their own state.

In addition, the 3D simulator manages the state, script execution, in-world communications, and off-world communications to multiple 3D clients. In one embodiment, multiple simulators can be run on a grid in a parallel processing configuration. In this embodiment, grid infrastructure services manage the quality of service, provisioning, and deployment of simulator instances.

Referring back to FIG. 1 for more details of the virtual command center 24 (i.e., the 3D simulator), there is a channel bank 26 that receives the event data generated from each of the datacenters 12 via the communications network 20 and gateway 22. The communications gateway 22 routes data to simulator instances that contain the object possessing the UUID of the recipient identified in the message header. Each channel bank 26 is assigned a channel to a datacenter 12 based on the UUID of the channel bank. As a result, each channel bank 26 receives data from the gateway 22 based on its UUID.

An aggregator 28 receives the event data from the channel bank 26. The aggregator 28 aggregates the event data into a composite dataset representative of current operation of the hardware and software elements that are managed by each datacenter 12.

A communications hub 30 receives the composite data from the aggregator and decrypts and decodes the packets represented by the composite data. In addition, the communications hub 30 receives communications from other sources such as an in-world virtual network 34, 3D equipment models 32 that mimic real world equipment and software, or other sources. These communications are dispatched to an outbound queue for immediate transmission to the holographic enterprise interface 18 or dispatched on the response string of a stateless synchronous transport.

In one embodiment, the equipment models 30 are placed within proximity to a repeater. In this embodiment, the equipment models listen on assigned frequencies for messages of interest. The applicability of a particular message to a model such as a server can be based on its name, IP address, or another token. As a result, the models can be built from the event data received from the datacenter. Instead of learning the models, it is possible to import the 3D models from other sources. In any event, the models are used to compare to the composite event data received by the communications hub 30. Any differences determined by the hub 30 are indicative of potentially troubling operation of the datacenter 12, hardware and middleware 14, system management software 16, or holographic enterprise interface 18. In one embodiment, equipment models and software visualizations can dispatch messages to repeaters by speaking on the appropriate channel. Ultimately these messages are sent to the communications hub for processing, and are handled in-world or sent to a holographic enterprise interface 18

The communications hub 30 is then configured to generate a visualization of both the composite data received from the datacenters 12 and any differences that may exist with the 3D models 32. The visualization comprises a 3D composite visual image(s) of the current operation of the enterprise. This visual representation is transmitted to users assigned to manage the enterprise via a communications network 34 and computing units 36. A rendering client operating on the computing units 36 then renders the visualization generated by the visual command center 24. In particular, this rendering client connects to a simulator instance and transmits a protocol which allows the client to render the state of the virtual command center 24 (3D simulator). The protocol includes information such as position and size of objects, textures, images, and animations, and other details necessary to render the 3D world. Those skilled in the art will recognize that different simulators use different protocols and that the virtual command center 24 of this disclosure is not dependent on any specific protocol type or implementation.

Figure 3:
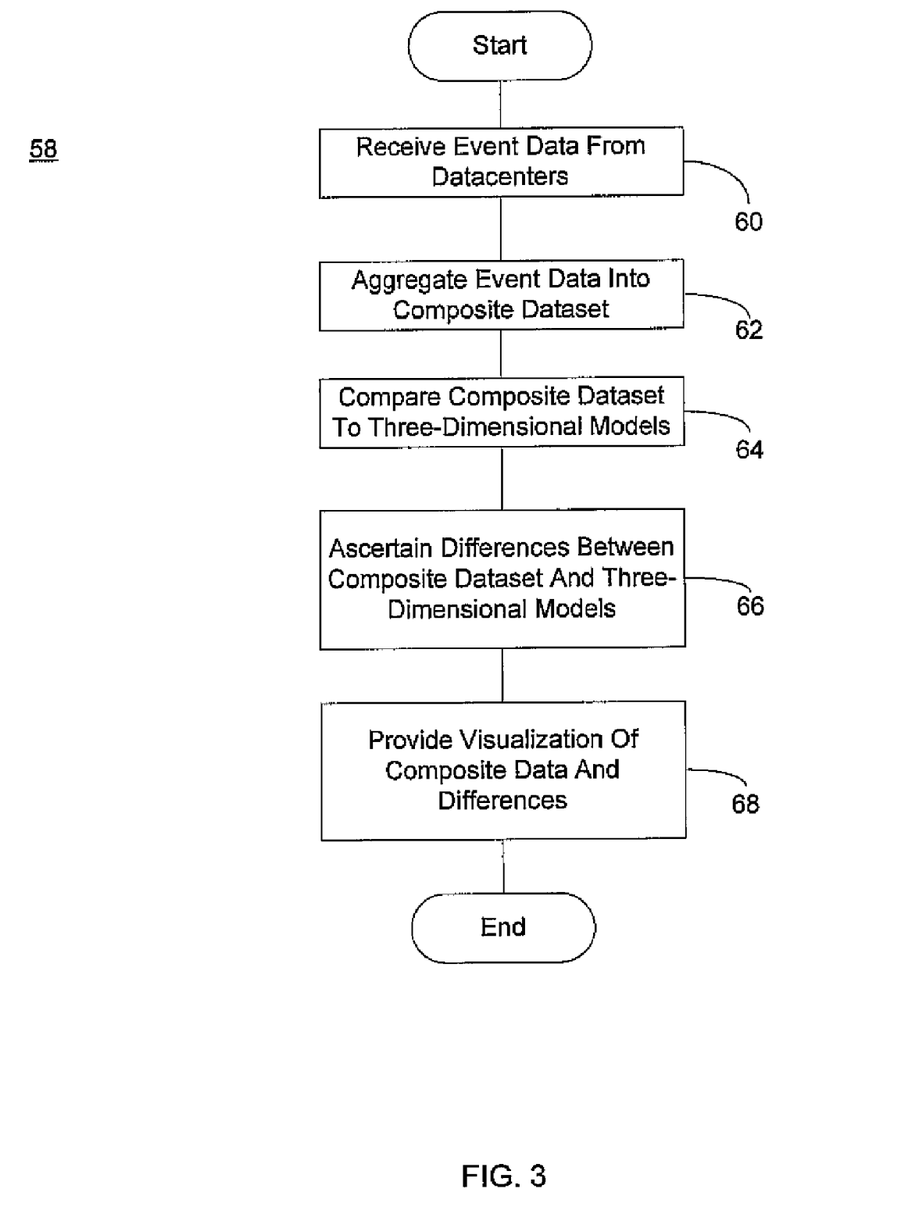
FIG. 3 shows a flow chart describing the operation of the system shown in FIG. 1.

FIG. 3 shows a flow chart 58 describing the operation of the system shown in FIG. 1 according to one embodiment. In FIG. 3, the process begins at 60 where event data is received from the plurality of geographically distributed enterprise datacenters 12. The event data is aggregated into a composite dataset representative of the current operation of the geographically distributed enterprise at 62. The composite dataset is compared at 64 to at least one three-dimensional model representative of the operation of the geographically distributed enterprise. Differences between the composite dataset and the at least one three-dimensional model are ascertained at 66. The differences are indicative of potentially troubling operation that may be occurring at one of the hardware and middleware 14, system management software 16 or holographic enterprise interface 18. A visualization of the composite data and any difference that may exist is provided or generated at 68. The visualization comprises a three-dimensional composite visual image of the current operation of the geographically distributed enterprise. This visual image can be rendered by the user and provide a simple and integrated overall understanding of the enterprise in real-time.

The foregoing flow chart shows some of the processing functions associated with the virtual command center 24. In this regard, each block represents a process act associated with performing these functions. It should also be noted that in some alternative implementations, the acts noted in the blocks may occur out of the order noted in the figure or, for example, may in fact be executed substantially concurrently or in the reverse order, depending upon the act involved. Also, one of ordinary skill in the art will recognize that additional blocks that describe the processing functions may be added.

Figure 4:
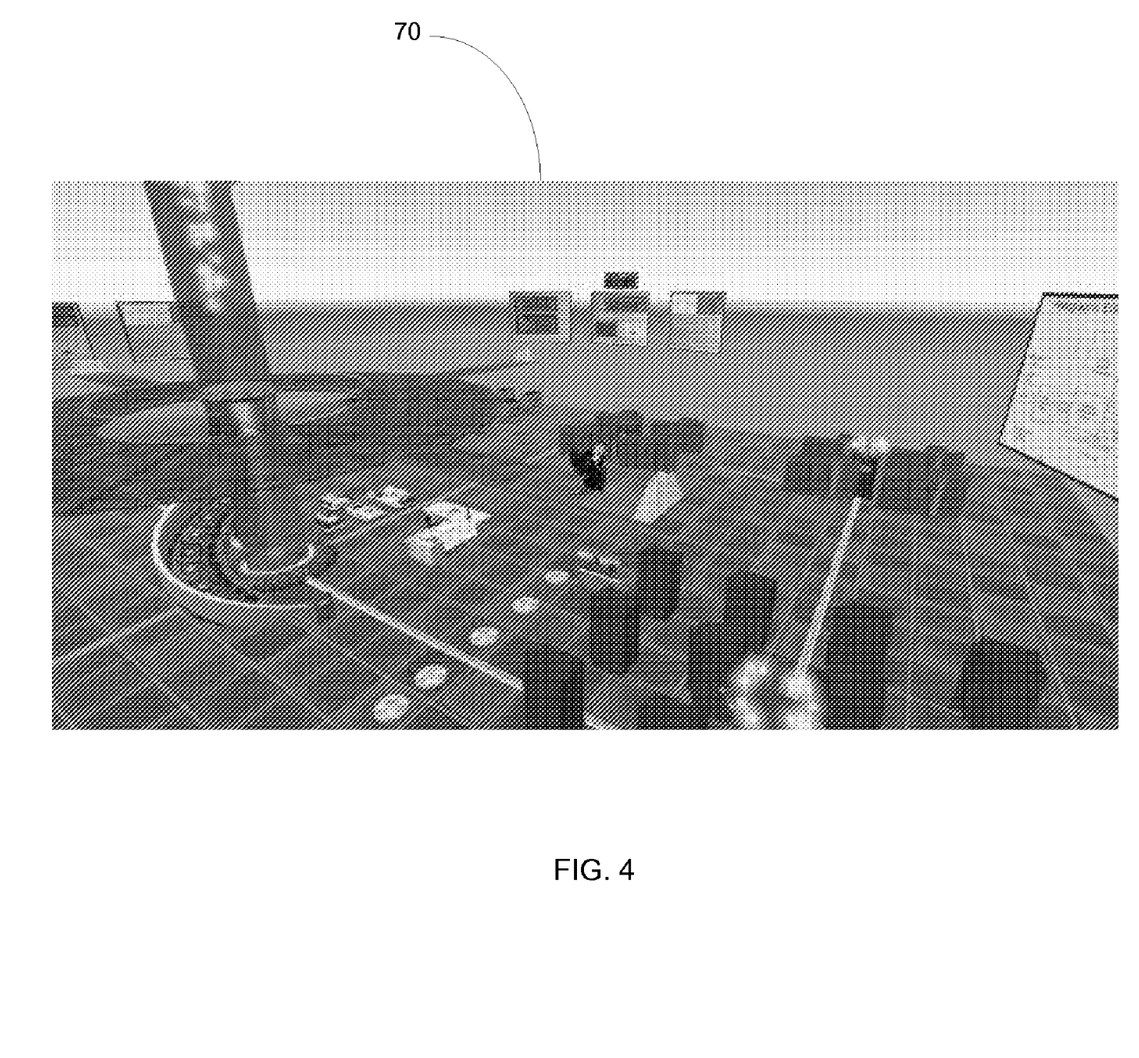
FIG. 4 provides a visualization of a virtual command center that shows components of a enterprise generated from the system shown in FIG. 1.

FIG. 4 provides a visualization 70 of a virtual command center that shows components of an enterprise generated from the system 10 shown in FIG. 1. In particular, the visualization shows key components of the enterprise. As shown in FIG. 4, screens, displays, and data towers are positioned in strategic locations around the command center for providing an overall understanding of the enterprise. The screens, displays, and data towers consume data from the virtual network and determine what types of information to display to the enterprise manager and other personnel responsible for managing the enterprise.

In another embodiment of this disclosure, the virtual command center 24 could be used as a service to charge fees for streaming visual representations from a plurality of geographically distributed enterprise datacenters in near-real time. In this embodiment, the provider of the virtual command center 24 or even the system 10 could offer these systems as a service by performing the functionalities described herein on a subscription and/or fee basis. In this case, the provider can create, deploy, maintain, support, etc., the virtual command center 24 or the system 10 that performs the processes described in the disclosure.

In still another embodiment, the methodologies disclosed herein can be used within a computer system to stream visual representations from a plurality of geographically distributed enterprise datacenters in near-real time. In this case, the system 10 including the virtual command center 24 can be provided and one or more systems for performing the processes described in the disclosure can be obtained and deployed to a computer infrastructure. To this extent, the deployment can comprise one or more of (1) installing program code on a computing device, such as a computer system, from a computer-readable medium; (2) adding one or more computing devices to the infrastructure; and (3) incorporating and/or modifying one or more existing systems of the infrastructure to enable the infrastructure to perform the process actions of the disclosure.

Figure 5:
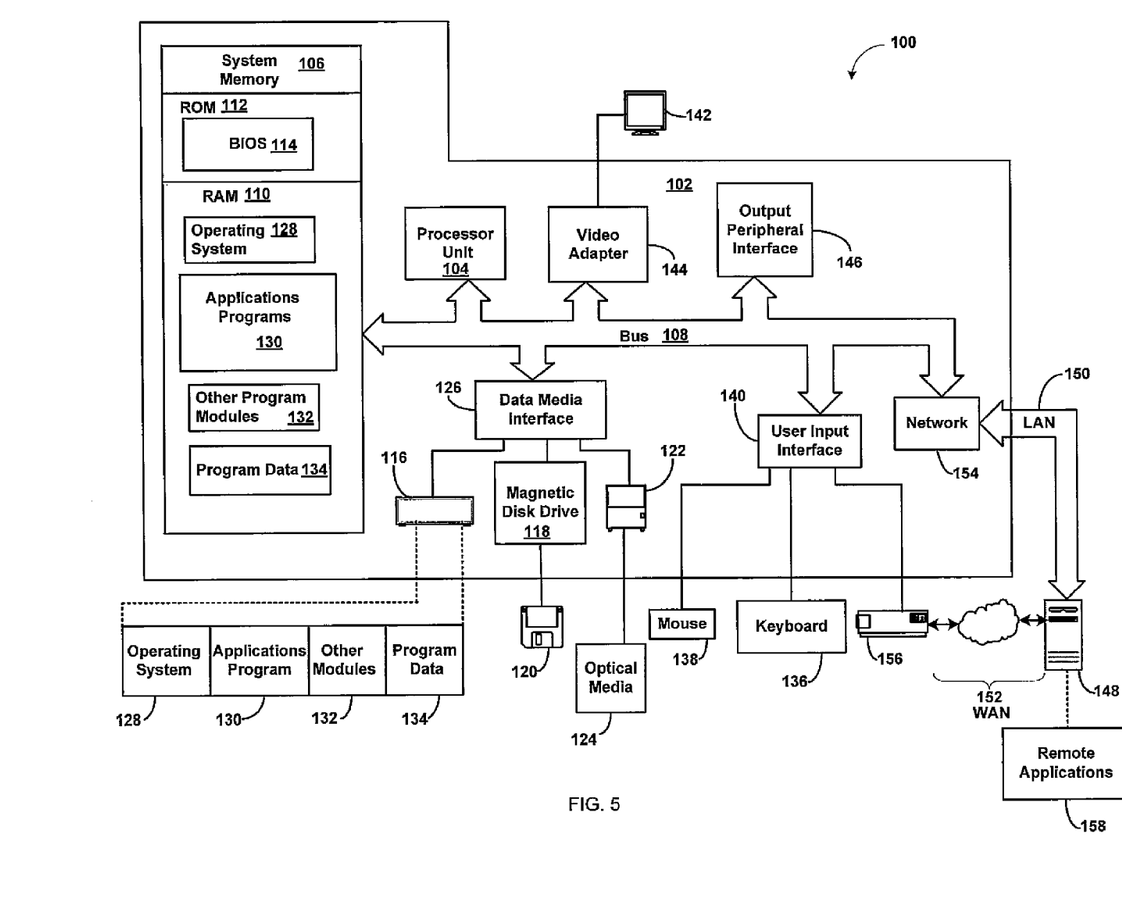
FIG. 5 shows a schematic of a computing environment in which elements of the system shown in FIG. 1 may operate.

FIG. 5 shows a schematic of a computing environment 100 in which elements of the system shown in FIG. 1 may operate. The exemplary computing environment 100 is only one example of a suitable computing environment and is not intended to suggest any limitation as to the scope of use or functionality of the approach described herein. Neither should the computing environment 100 be interpreted as having any dependency or requirement relating to any one or combination of components illustrated in FIG. 5.

In the computing environment 100 there is a computer 102 which is operational with numerous other general purpose or special purpose computing system environments or configurations. Examples of well known computing systems, environments, and/or configurations that may be suitable for use with an exemplary computer 102 include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The exemplary computer 102 may be described in the general context of computer-executable instructions, such as program modules, being executed by a computer. Generally, program modules include routines, programs, objects, components, logic, data structures, and so on, that performs particular tasks or implements particular abstract data types. The exemplary computer 102 may be practiced in distributed computing environments where tasks are performed by remote processing devices that are linked through a communications network. In a distributed computing environment, program modules may be located in both local and remote computer storage media including memory storage devices.

As shown in FIG. 5, the computer 102 in the computing environment 100 is shown in the form of a general-purpose computing device. The components of computer 102 may include, but are not limited to, one or more processors or processing units 104, a system memory 106, and a bus 108 that couples various system components including the system memory 106 to the processor 104.

Bus 108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 102 typically includes a variety of computer readable media. Such media may be any available media that is accessible by computer 102, and it includes both volatile and non-volatile media, removable and non-removable media.

In FIG. 5, the system memory 106 includes computer readable media in the form of volatile memory, such as random access memory (RAM) 110, and/or non-volatile memory, such as ROM 112. A BIOS 114 containing the basic routines that help to transfer information between elements within computer 102, such as during start-up, is stored in ROM 112. RAM 110 typically contains data and/or program modules that are immediately accessible to and/or presently operated on by processor 104.

Computer 102 may further include other removable/non-removable, volatile/non-volatile computer storage media. By way of example only, FIG. 5 illustrates a hard disk drive 116 for reading from and writing to a non-removable, non-volatile magnetic media (not shown and typically called a "hard drive"), a magnetic disk drive 118 for reading from and writing to a removable, non-volatile magnetic disk 120 (e.g., a "floppy disk"), and an optical disk drive 122 for reading from or writing to a removable, non-volatile optical disk 124 such as a CD-ROM, DVD-ROM or other optical media. The hard disk drive 116, magnetic disk drive 118, and optical disk drive 122 are each connected to bus 108 by one or more data media interfaces 126.

The drives and their associated computer-readable media provide nonvolatile storage of computer readable instructions, data structures, program modules, and other data for computer 102. Although the exemplary environment described herein employs a hard disk 116, a removable magnetic disk 118 and a removable optical disk 122, it should be appreciated by those skilled in the art that other types of computer readable media which can store data that is accessible by a computer, such as magnetic cassettes, flash memory cards, digital video disks, RAMs, ROM, and the like, may also be used in the exemplary operating environment.

A number of program modules may be stored on the hard disk 116, magnetic disk 120, optical disk 122, ROM 112, or RAM 110, including, by way of example, and not limitation, an operating system 128, one or more application programs 130, other program modules 132, and program data 134. Each of the operating system 128, one or more application programs 130, other program modules 132, and program data 134 or some combination thereof, may include an implementation of the system 10 shown in FIG. 1 for streaming visual representations of an enterprise in near-real time.

A user may enter commands and information into computer 102 through optional input devices such as a keyboard 136 and a pointing device 138 (such as a "mouse"). Other input devices (not shown) may include a microphone, joystick, game pad, satellite dish, serial port, scanner, camera, or the like. These and other input devices are connected to the processor unit 104 through a user input interface 140 that is coupled to bus 108, but may be connected by other interface and bus structures, such as a parallel port, game port, or a universal serial bus (USB).

An optional monitor 142 or other type of display device is also connected to bus 108 via an interface, such as a video adapter 144. In addition to the monitor, personal computers typically include other peripheral output devices (not shown), such as speakers and printers, which may be connected through output peripheral interface 146.

Computer 102 may operate in a networked environment using logical connections to one or more remote computers, such as a remote server/computer 148. Remote computer 148 may include many or all of the elements and features described herein relative to computer 102.

Logical connections shown in FIG. 5 are a local area network (LAN) 150 and a general wide area network (WAN) 152. Such networking environments are commonplace in offices, enterprise-wide computer networks, intranets, and the Internet. When used in a LAN networking environment, the computer 102 is connected to LAN 150 via network interface or adapter 154. When used in a WAN networking environment, the computer typically includes a modem 156 or other means for establishing communications over the WAN 152. The modem, which may be internal or external, may be connected to the system bus 108 via the user input interface 140 or other appropriate mechanism.

In a networked environment, program modules depicted relative to the personal computer 102, or portions thereof, may be stored in a remote memory storage device. By way of example, and not limitation, FIG. 5 illustrates remote application programs 158 as residing on a memory device of remote computer 148. It will be appreciated that the network connections shown and described are exemplary and other means of establishing a communications link between the computers may be used.

An implementation of an exemplary computer 102 may be stored on or transmitted across some form of computer readable media. Computer readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

It is apparent that there has been provided with this disclosure an approach for management of enterprise systems and applications using three-dimensional visualization technology. While the disclosure has been particularly shown and described in conjunction with a preferred embodiment thereof, it will be appreciated that variations and modifications will occur to those skilled in the art. Therefore, it is to be understood that the appended claims are intended to cover all such modifications and changes as fall within the true spirit of the invention.

What is claimed is:

1. A method for streaming visual representations from a plurality of geographically distributed enterprise datacenters in near-real time, comprising:
    receiving non-three dimensional event data from the plurality of geographically distributed enterprise datacenters, each datacenter comprising a holograph enterprise interface that contains components for encoding the non-three dimensional event data into a Holographic Protocol Architecture (HPA), wherein the Holographic Protocol Architecture is a protocol specification that defines packet types and conversation patterns to interact with a virtual command center via a communication network;
    transforming the non-three dimensional event data from each of the plurality of geographically distributed enterprise datacenters into three-dimensional holographic event data of the hardware and software elements that each datacenter is managing;
    aggregating the three-dimensional holographic event data into a composite three-dimensional holographic dataset representative of the current operation of the geographically distributed enterprise;
    comparing the composite three-dimensional holographic dataset to at least one three-dimensional mode representative of the operation of the geographically distributed interprise;
    ascertaining differences between the composite three-dimensional holographic dataset and the at least one three-dimensional model, wherein the differences are indicative of potentially troubling operation; and
    providing a visualization at a communications hub in the virtual command center of both the composite data and any difference that may exist, wherein the visualization comprises a three-dimensional composite visual image of the current operation of the geographically distributed enterprise.

2. The method according to claim 1, further comprising building the at least one three-dimensional model from the three-dimensional holographic event data.

3. The method according to claim 1, wherein the visualization contains a warning that is indicative of potentially troubling operation of at least one of the plurality of geographically distributed enterprise datacenters.

4. The method according to claim 1, further comprising providing messages to the plurality of geographically distributed enterprise data-centers for controlling operation thereof.

5. A system for streaming visual representations of an enterprise in near-real time, comprising:
    a plurality of geographically distributed enterprise datacenters each configured to obtain non-three dimensional event data from hardware and software elements in the enterprise;
    a holographic enterprise interface containing component for encoding the non-three dimensional event data into a Holographic Protocol Architecture (HPA), wherein the Holographic Protocol Architecture is a protocol specification that define packet types and conversation patterns to interact with a three-dimensional simulator via a communication network, wherein the holographic enterprise interface is configured to transform the non-three dimensional event data from each of the plurality of geographically distributed enterprise datacenters into three-dimensional holographic event data; and
    a virtual command center configured to receive the three-dimensional holographic event data from the holographic enterprise interface using the Holographic Protocol Architecture, aggregate the three-dimensional holographic event data into a composite three-dimensional holographic dataset representative of the current operation of the enterprise, compare the composite three-dimensional holographic dataset to at least one three-dimensional model representative of the operation of the geographically distributed enterprise, and provide a visualization at a communication hub of the composite data and any difference that may exist wherein the visualization comprises a composite a three-dimensional visual image of the current operation of the geographically distributed enterprise,
    wherein the virtual command center is further configured to ascertain differences between the composite three-dimensional holographic dataset and the at least one three-dimensional model, wherein the differences are indicative of potentially troubling operation of at least one of the plurality of geographically distributed enterprise datacenters.

6. The system according to claim 5, wherein the virtual command center is further configured to build the at least one three-dimensional model from the three-dimensional holographic event data.

7. The system according to claim 5, wherein the visualization contains a warning that is indicative of the potentially troubling operation of at least one of the plurality of geographically distributed enterprise datacenters.

8. A non-transitory computer-readable storage medium storing computer instructions, which when executed, enables a computer system to stream visual representations from a plurality of geographically distributed enterprise datacenters in near-real time, the computer instructions comprising:
    receiving non-three dimensional event data from the plurality of geographically distributed enterprise datacenters, wherein each datacenter comprises a holograph enterprise interface that contains components for encoding the non-three dimensional event data into a Holographic Protocol Architecture (HPA), wherein the Holographic Protocol Archetecture is a protocol specification that defines packet types and conversation patterns to interact with a virtual command center via a communication network;
    transforming the non-three dimensional event data from each of the plurality of geographically distributed enterprise datacenters into three-dimensional holographic event data of the hardware and software elements that each datacenter is managing;
    aggregating the three-dimensional holographic event data into a composite three-dimensional holographic dataset representative of the current operation of the geographically distributed enterprise;
    comparing the composite three-dimensional holographic dataset to at least one three-dimensional model representative of the operation of the geographically distributed enterprise;

ascertaining differences between the composite three-dimensional holographic dataset and the at least one three-dimensional model, wherein the differences are indicative of potentially troubling operation; and providing a visualization at a communications huh in the virtual command center of both the composite data and any difference that may exist, wherein the visualization comprises a three-dimensional composite visual image of the current operation of the geographically distributed enterprise.

9. The non-transitory computer-readable storage medium according to claim 8, further comprising instructions for building the at least one three-dimensional model from the three-dimensional holographic event data.

10. The non-transitory computer-readable storage medium according to claim 8, wherein the visualization contains a warning that is indicative of potentially troubling operation of at least one of the plurality of geographically distributed enterprise datacenters.

11. A method for deploying an enterprise visualization tool for use in a computer system that streams visual representations of an enterprise in near-real time, comprising:

providing a computer infrastructure operable to;

none-three dimensional event data from the plurality of geographically distributed enterprise datacenters, each datacenter comprising a holographic enterprise interface that contains components for encoding the non-three dimensional event data into a holographic Protocol Architecture (HPA), wherein the Holographic Protocol Architecture is a protocol specification that defines packet types and conversation patterns to interact with a virtual command center via a communication network:

transform the non-three dimensional event data from each of the plurality of geographically distributed enterprise datacenters into three-dimensional holographic event data of the hardware and software elements that each datacenter is managing;

aggregate the three-dimensional holographic event data into a composite three-dimensional holographic dataset representative of the current operation of the geographically distributed enterprise;

compare the composite thr e-dimension holographic dataset to at least one three-dimensional model representative of the operation of the geographically distributed enterprise;

ascertain differences between the composite three-dimensional holographic dataset and the at least one three-dimensional model, wherein the differences are indicative of potentially troubling operation; and provide a visualization at a communications hub in the virtual command center of both the composite data and any difference that may exist, wherein the visualization comprises a three-dimensional composite visual image of the current operation of the geographically distributed enterprise.

* * * * *